March 31, 1936. C. C. KING 2,036,052

HARROW

Filed June 10, 1935

INVENTOR
CLARK C. KING
BY Paul, Paul & Moore
ATTORNEYS

Patented Mar. 31, 1936

2,036,052

UNITED STATES PATENT OFFICE 2,036,052

HARROW

Clark C. King, Owatonna, Minn., assignor to Jos. J. Kovar Co., Inc., Owatonna, Minn., a corporation of Minnesota Application June 10, 1935, Serial No. 25,840

3 Claims. (Cl. 55—36)

This invention relates to new and useful improvements in harrows and more particularly to the teeth thereof.

An object of the present invention is to provide a tooth for a spring tooth harrow, the working end of which is so constructed and shaped that the tooth will be substantially self-sharpening.

A further object is to provide an involute harrow tooth, the working end of which is substantially triangular in cross-section, whereby its front or soil-engaging face is composed of oppositely disposed inclined faces terminating at the center of the tooth in a longitudinally extending ridge, which acts to strengthen the tooth as well as to divide or separate the soil through which the tooth may be moving, and whereby a better scouring action is obtained than is possible with ordinary harrow teeth in which the front or soil-engaging faces are substantially flat.

Other objects of the invention reside in the specific construction of the working end of the tooth, which comprises a longitudinal ridge extending rearwardly from the tip or free end of the tooth to the extent that that portion of the tooth which is normally engaged with the ground or soil, when the tooth is in use, is greatly strengthened, and whereby grass and foreign matter engaged by the tooth, as it is drawn through the soil, will readily slide upon the tooth to the surface of the ground, where it will not tend to clog, or in any way interfere with the operation of the tooth, and whereby the point of the tooth also becomes substantially self-sharpening.

Other objects of the invention will appear from the following description and accompanying drawing and will be pointed out in the annexed claims.

In the accompanying drawing there has been disclosed a structure designed to carry out the various objects of the invention, but it is to be understood that the invention is not confined to the exact features shown as various changes may be made within the scope of the claims which follow.

Figure 1:
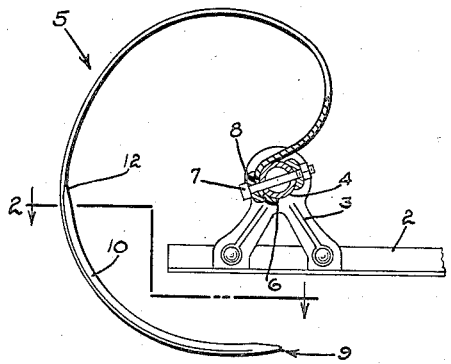
Figure 1 is a view showing a portion of a harrow frame with the novel tooth secured to the rock shaft thereof.

In the selected embodiment of the invention here shown, for purposes of disclosure, there is illustrated in Figure 1, a portion of a harrow frame 2 having a bracket secured thereto in which is mounted a suitable rock shaft 4. Suitable means, not shown, is provided for relatively rotating the rock shaft in its bearings, whereby the terminals of the harrow teeth, generally indicated by the numeral 5, may be relatively adjusted with respect to the ground.

An important feature of the present invention resides in the specific construction of the teeth 5, one of which is shown in detail in the drawing. This tooth, as best shown in Figure 1, is of the involute type, and has its upper end portion 6 curved or bent to provide a suitable seat adapted to receive the rock shaft 4. A suitable clamping bolt 7 traverses an elongated aperture 8 in the end portion 6 of the tooth, and also passes through alined apertures in the rock shaft 4, as will readily be understood by reference to Figure 1. By thus securing the teeth to the rock shaft, they may be rotatively adjusted thereon by loosening the bolt 7, to thereby aline them with one another.

Figure 2:
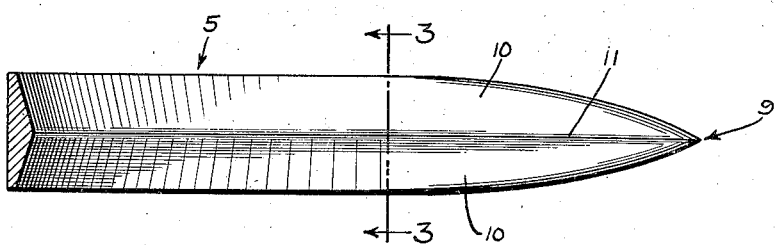
Figure 2 is an enlarged detail sectional plan view of the free end of the tooth.
Figure 3:
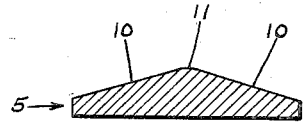
Figure 3 is an enlarged detail sectional view on the line 3—3 of Figure 2.

The free end portion of each tooth, generally indicated by the numeral 9, is pointed or sharpened as best shown in Figure 2, and the tooth is made thicker along its center for a distance extending rearwardly from the tip of the tooth to a point slightly above the ground line, when the tooth is in use. By thus making the tooth thicker at its center, the opposite faces 10—10 thereof will slope downwardly and rearwardly from the center of the tooth to the outer edges thereof, as best shown in Figure 3, and a longitudinal ridge 11 is provided in the medial plane of the tooth.

Figure 4:
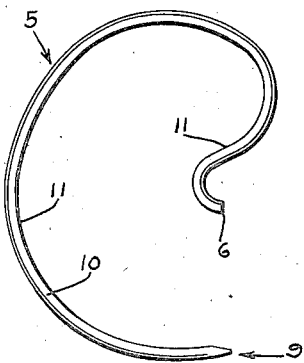
Figure 4 is a view showing a tooth which is of the same shape cross-sectionally its entire length.

The inclined faces 10, as hereinbefore stated, preferably extend from the point of the tooth to the point 12 shown in Figure 1, although, if desired, the ridge 11 may extend the full length of the tooth, as shown in Figure 4.

By shaping the tooth, as shown in Figure 1, a much better scouring action is obtained in the soil, than can possibly be obtained with teeth having flat front faces as shown in the prior art. The tooth is approximately three-eighths of an inch thick at its center, and one-eighth of an inch at its edges, whereby the front face of the tooth is substantially V-shaped, as will readily be seen by reference to Figures 2 and 3.

Actual experience has proven that there is a decided advantage in shaping the tooth, as herein described, in that it substantially eliminates regrinding or reshaping of the pointed end of the tooth because, in actual use, the pointed end of the tooth is usually worn off uniformly at opposite sides of the center of the tooth, whereby the normal shape of the tooth is maintained, even though the terminal of the tooth is gradually worn away.

In Figure 1, the lower half only of the tooth is shown thickened at its center, while in the form shown in Figure 4, the tooth is substantially of the same shape, cross-sectionally, its entire length. It is now more or less common practice to sharpen the teeth of a spring tooth harrow when they become worn. This is often done by upsetting the metal at the point of the tooth and hammering or drawing it out with a hammer until the desired edge is obtained. To thus sharpen the teeth requires labor and is expensive.

In the novel tooth herein disclosed, the center ridge 11 extends at least the full length of the working end of the tooth, whereby the tooth is substantially triangular in cross-section, as shown in Figure 3, and actually becomes self-sharpening, because of the tooth wearing off more quickly at its side edges than at its center, as a result of its edges being relatively thinner than the center of the tooth. As hereinbefore stated, by shaping the working end of the tooth as herein shown, a much better scouring action is obtained when the tooth is drawn through the soil, and, at the same time, weeds and other rubbish will work smoothly to the top of the ground surface and become disengaged from the tooth, which is substantially impossible when using harrow teeth in which the major portion of the tooth is flat.

The tooth may readily be manufactured without difficulty, and will give longer service than an ordinary tooth because of its entire working end being reinforced, as herein disclosed, and is inexpensive because it does not require frequent sharpening, as do ordinary teeth of this general type.

I claim as my invention:

1. In a harrow, an involute tooth having its free end pointed and formed with a ridge along its center, said ridge extending rearwardly from the point of the tooth a distance at least equal to the length of its working end.

2. In a spring tooth harrow, an involute tooth having its free end sharpened and the top and front faces thereof tapering inwardly from the edges of the tooth, whereby the tooth is provided with oppositely disposed inclined faces adapted to engage the soil and direct the same to the sides of the tooth with a scouring action.

3. In a spring tooth harrow, an involute tooth fastened at one end and having its opposite end sharpened and adapted to engage the ground, and said tooth having its inner face formed with a longitudinal ridge disposed in the medial plane of the tooth to thereby provide oppositely disposed inclined faces adapted to dig into the soil, and whereby the soil, weeds and other matter engaged by the tooth will readily slide off the tooth to opposite sides thereof with a scouring action, when the tooth is in use, and also whereby the tooth will so wear as to be self-sharpening.

CLARK C. KING.